(12) United States Patent
Su et al.

(10) Patent No.: US 7,876,348 B2
(45) Date of Patent: Jan. 25, 2011

(54) LASER SCANNING UNIT FOR A LASER PRINTER

(75) Inventors: Jenn-Chyi Su, Hsinchu (TW);
Yung-Shan Lin, Ping-Tung Hsien (TW);
Chin-Ta Ma, Kao-Hsiung (TW)

(73) Assignee: Lite-On Technology Corp., Taipei (TW)

(*) Notice: Subject to any disclaimer, the term of this patent is extended or adjusted under 35 U.S.C. 154(b) by 751 days.

(21) Appl. No.: 11/847,339

(22) Filed: Aug. 30, 2007

(65) Prior Publication Data

US 2008/0143812 A1     Jun. 19, 2008

(30) Foreign Application Priority Data

Dec. 15, 2006    (TW) .............................. 95147109 A

(51) Int. Cl.
*G02B 26/08*  (2006.01)
*G02B 26/10*  (2006.01)
*G02B 26/12*  (2006.01)
*B41J 15/14*  (2006.01)
*B41J 27/00*  (2006.01)

(52) U.S. Cl. .................. 347/257; 347/242; 359/205.1

(58) Field of Classification Search ............... 347/242, 347/257; 359/205.1, 208.1, 208.2
See application file for complete search history.

(56) References Cited

U.S. PATENT DOCUMENTS

| | | | | |
|---|---|---|---|---|
| 5,963,240 A * | 10/1999 | Shinohara et al. | ............ | 347/116 |
| 6,005,703 A * | 12/1999 | Maddox et al. | .......... | 359/206.1 |
| 6,271,869 B1 * | 8/2001 | Tada et al. | .................. | 347/116 |
| 6,342,963 B1 * | 1/2002 | Yoshino | ................... | 359/204.1 |
| 7,218,337 B2 * | 5/2007 | Yokoyama | ................... | 347/241 |
| 7,388,191 B2 * | 6/2008 | Bang | ........................ | 250/234 |
| 2004/0104993 A1 * | 6/2004 | Yokoyama | ................... | 347/241 |

* cited by examiner

*Primary Examiner*—Uyen-Chau N Le
*Assistant Examiner*—John M Bedtelyon
(74) *Attorney, Agent, or Firm*—Rosenberg, Klein & Lee

(57) ABSTRACT

A laser scanning unit for a laser printer includes a frame connected to a casing, an optical system module installed on the frame directly for generating laser beams according to print data, an optical scanning module fixed on the frame for reflecting the laser beams generated by the optical system module, a curved lens for reflecting the laser beams reflected from the optical scanning module, and a reflector module installed on the frame directly for reflecting the laser beams reflected from the curved lens to an organic photo conductor.

20 Claims, 15 Drawing Sheets

Poior Art

LASER SCANNING UNIT FOR A LASER PRINTER

BACKGROUND OF THE INVENTION

1. Field of the Invention

The present invention relates to a laser scanning unit, and especially a laser scanning unit applied to a laser printer without a housing.

2. Description of the Prior Art

Please refer to FIG. 1. FIG. 1 is a diagram of a laser printer 10 according to the prior art. The laser printer 10 includes a casing 12, an organic photo conductor 14, a charged roller 16, a laser scanning unit 18, a toner cartridge 20, a developer roller 22, a transfer roller 24, a fuser 26, and a discharge unit 28. The casing 12 is for shielding internal components of the laser printer 10. The organic photo conductor 14 is installed inside the casing 12 in a rotatable manner. The charged roller 16 installed inside the casing 12 distributes charges on the surface of the organic photo conductor 14. The laser scanning unit 18 installed inside the casing 12 projects laser beams onto the surface of the organic photo conductor 14. The toner cartridge 20 installed inside the casing 12 stores toner. The developer roller 22 installed inside the casing 12 and disposed at one side of the toner cartridge 20 is capable of absorbing toner from the toner cartridge 20. The transfer roller 24 installed inside the casing 12 connects to a negative bias (not shown). The fuser 26 installed inside the casing 12 melts a plastic portion of the toner. The discharge unit 28 installed inside the casing 12 discharges the charges on the organic photo conductor 14.

The printing procedures and principles of the laser printer 10 are introduced below. First, the charged roller 16 distributes electrons and positive charges on the surface of the organic photo conductor 14. Then, the laser scanning unit 18 projects laser beams onto a specific region of the surface of the organic photo conductor 14. Because the organic photo conductor 14 is composed of highly-photoconductive material, when the specific region of the surface of the organic photo conductor 14 receives the laser beams emitted from the laser scanning unit 18, the collisions between photons of the laser beams and electrons of the highly-photoconductive material ionize the electrons and make the specific region conductive, so as to form an electrostatic image with lower voltage. Voltage at a position of the electrostatic image is related to the frequency of the laser beam. In other words, the higher the frequency of the laser beam projected onto a point, the lower the voltage of the point, and vice versa. Subsequently, when the organic photo conductor 14 rotates to a position where the electrostatic image is adjacent to the developer roller 22, because the developer roller 22 has already absorbed charged toner stored in the toner cartridge 20, parts of the electrostatic image of certain voltages will absorb the charged toner from the developer roller 22, and the lower the voltage of a point on the electrostatic image is, the more charged toner the point will absorb. Next, when the organic photo conductor 14 rotates to a position where the electrostatic image is adjacent to the transfer roller 24, because the negative bias the transfer roller 24 is electrically connected to is much lower than the voltage at any position on the electrostatic image (meaning the absolute value of the minus bias is greater than the absolute value of the voltage at any position on the electrostatic image), the transfer roller 24 is able to transfer the charged toner on the electrostatic image to a print medium 11 between the transfer roller 24 and the organic photo conductor 14. At this time, the toner stays on the print medium 11 temporarily because of the attraction of static electricity, therefore any vibration of the laser printer 10 or other external forces will shift the toner on the print medium 11. But after the print medium 11 passes through the fuser 26, the heat generated by the fuser 26 will melt the plastic portion of the toner on the print medium 11 so as to make the toner stick to the print medium 11. After the transfer roller 24 transfers the toner on the electrostatic image to the print medium 11, and the organic photo conductor 14 rotates to a position where the electrostatic image is adjacent to the discharge unit 28, the discharge unit 28 will discharge the charges on the electrostatic image completely, so that when the organic photo conductor 14 rotates to a specific region (the electrostatic image has already disappeared) adjacent to the charged roller 16, the charged roller 16 is able to redistribute charges on the surface of the organic photo conductor 14. In addition, the laser scanning unit 18 comprises an optical system module 30, an optical scanning module 32, a curved lens 33, and a reflector module 34. The optical system module 30 generating laser beams according to print data comprises a laser beam source 36 for emitting the laser beams, and an optical optimizing element 38 for optimizing the laser beams emitted from the laser beam source 36. The optical scanning module 32 is for reflecting the laser beams generated by the optical system module 30. The curved lens 33 for reflecting the laser beams reflected from the optical scanning module 32 is an f-θ lens. The reflector module 34 is for reflecting the laser beams reflected from the curved lens 33 to the organic photo conductor 14.

Please refer to FIG. 2 and FIG. 3. FIG. 2 is a structure diagram of the laser scanning unit 18 according to the prior art, and FIG. 3 is a diagram of internal components of the laser scanning unit 18 according to the prior art. The conventional laser scanning unit 18 is designed as a module. The conventional laser scanning unit 18 includes a housing 40 for shielding internal components of the laser scanning unit 18. The optical system module 30, the optical scanning module 32, and the reflector module 34 are all installed on the housing 40, and the housing 40 is fastened on a frame 42. The frame 42 has a mechanism interface for connecting the laser printer 10, e.g. connecting to the casing 12 in order to fasten the whole laser scanning unit 18. However, in such a design in which the internal components of the laser scanning unit 18 are integrated inside the housing 40, and the housing 40 is installed on the frame 42, the housing 40 makes the assembly more complicated.

SUMMARY OF THE INVENTION

The present invention discloses a laser scanning unit for a laser printer without a housing to solve the above mentioned problem.

The present invention discloses a laser scanning unit for a laser printer comprising a frame connected to a casing, an optical system module installed on the frame directly for generating laser beams according to print data, an optical scanning module fixed on the frame for reflecting the laser beams generated by the optical system module, a curved lens for reflecting the laser beams reflected from the optical scanning module, and a reflector module installed on the frame directly for reflecting the laser beams reflected from the curved lens to an organic photo conductor.

The present invention discloses a laser printer comprising a casing, an organic photo conductor installed inside the casing in a rotatable manner, an optical scanning module installed inside the casing comprising a frame connected to a casing, an optical system module installed on the frame directly for generating laser beams according to print data, an optical scanning module fixed on the frame for reflecting the laser beams generated by the optical system module, a curved lens for reflecting the laser beams reflected from the optical scanning module, and a reflector module installed on the frame directly for reflecting the laser beams reflected from the curved lens to an organic photo conductor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
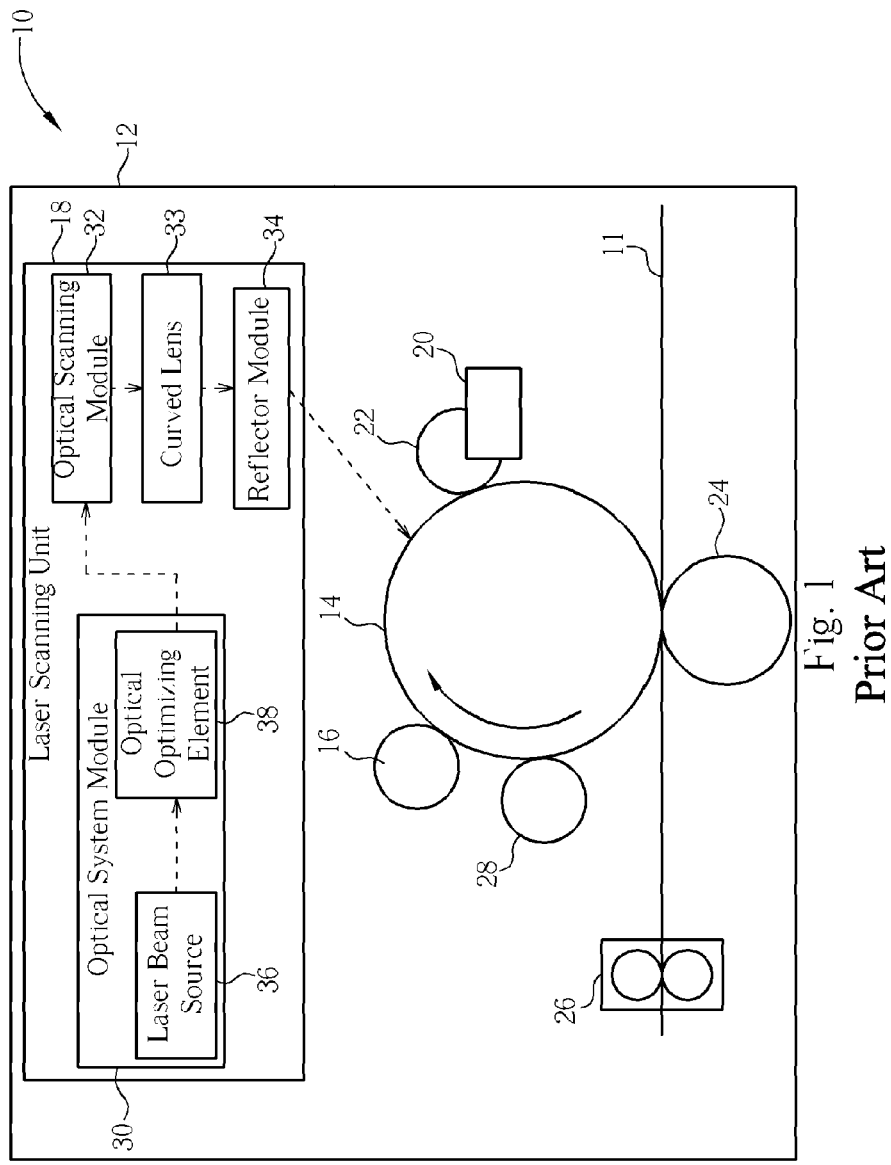
FIG. 1 is a diagram of a laser printer according to the prior art.
Figure 2:
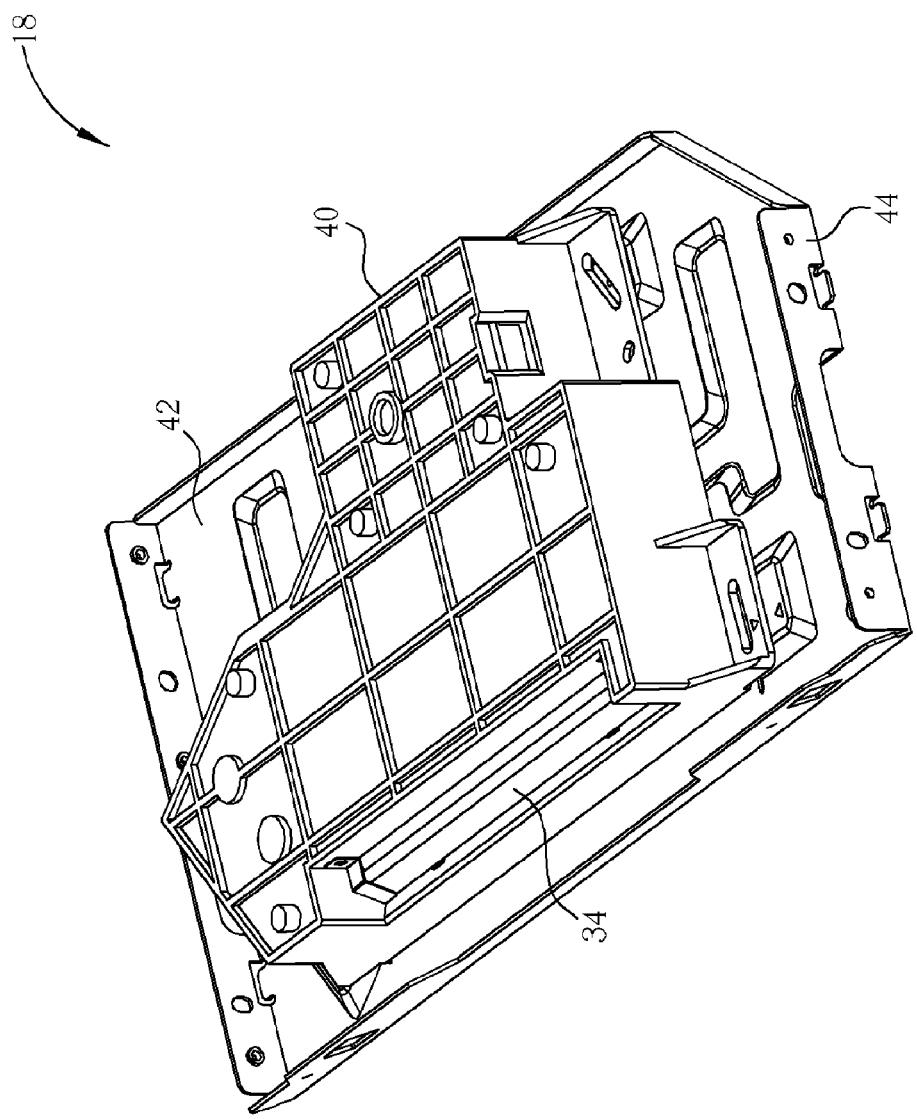
FIG. 2 is a structure diagram of a laser scanning unit according to the prior art.
Figure 3:
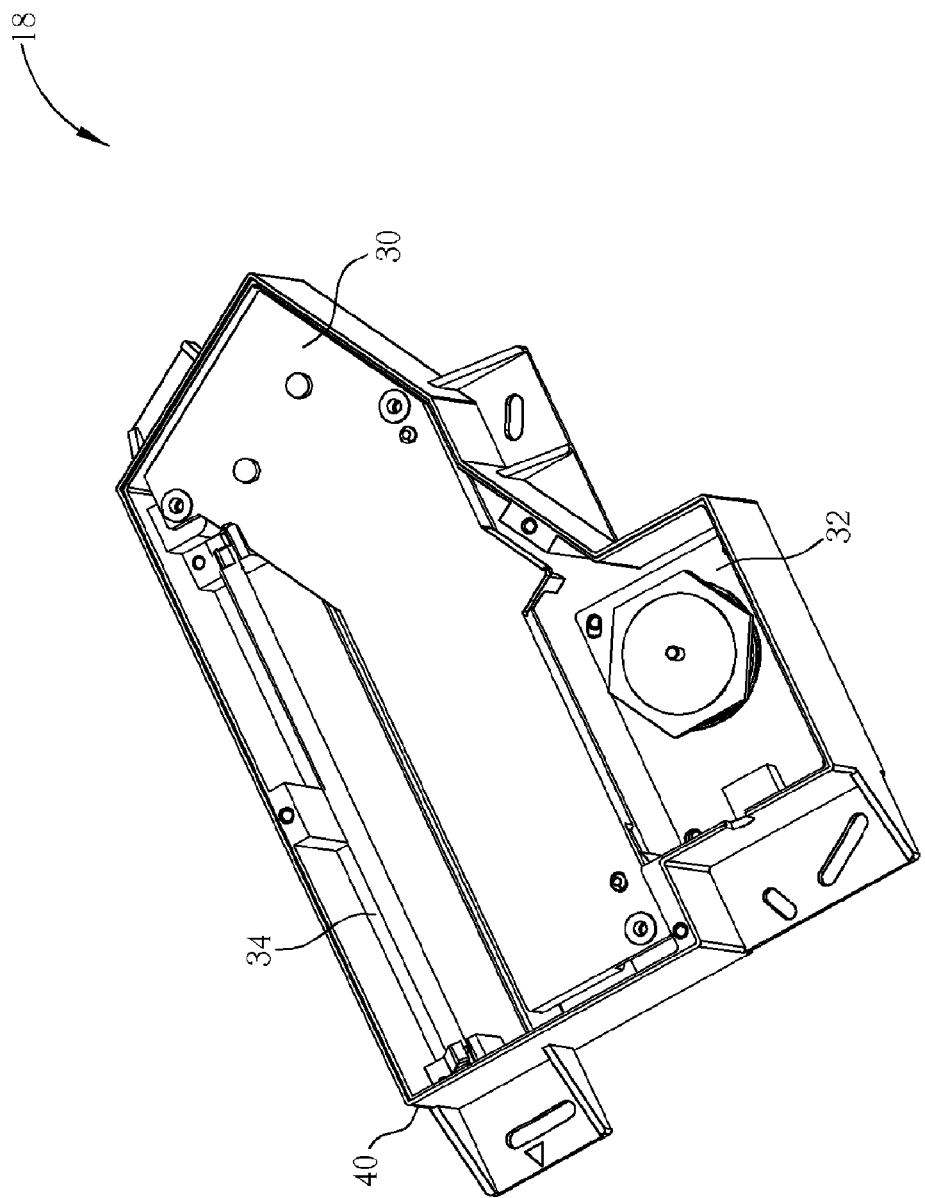
FIG. 3 is a diagram of internal components of a laser scanning unit according to the prior art.
Figure 4:
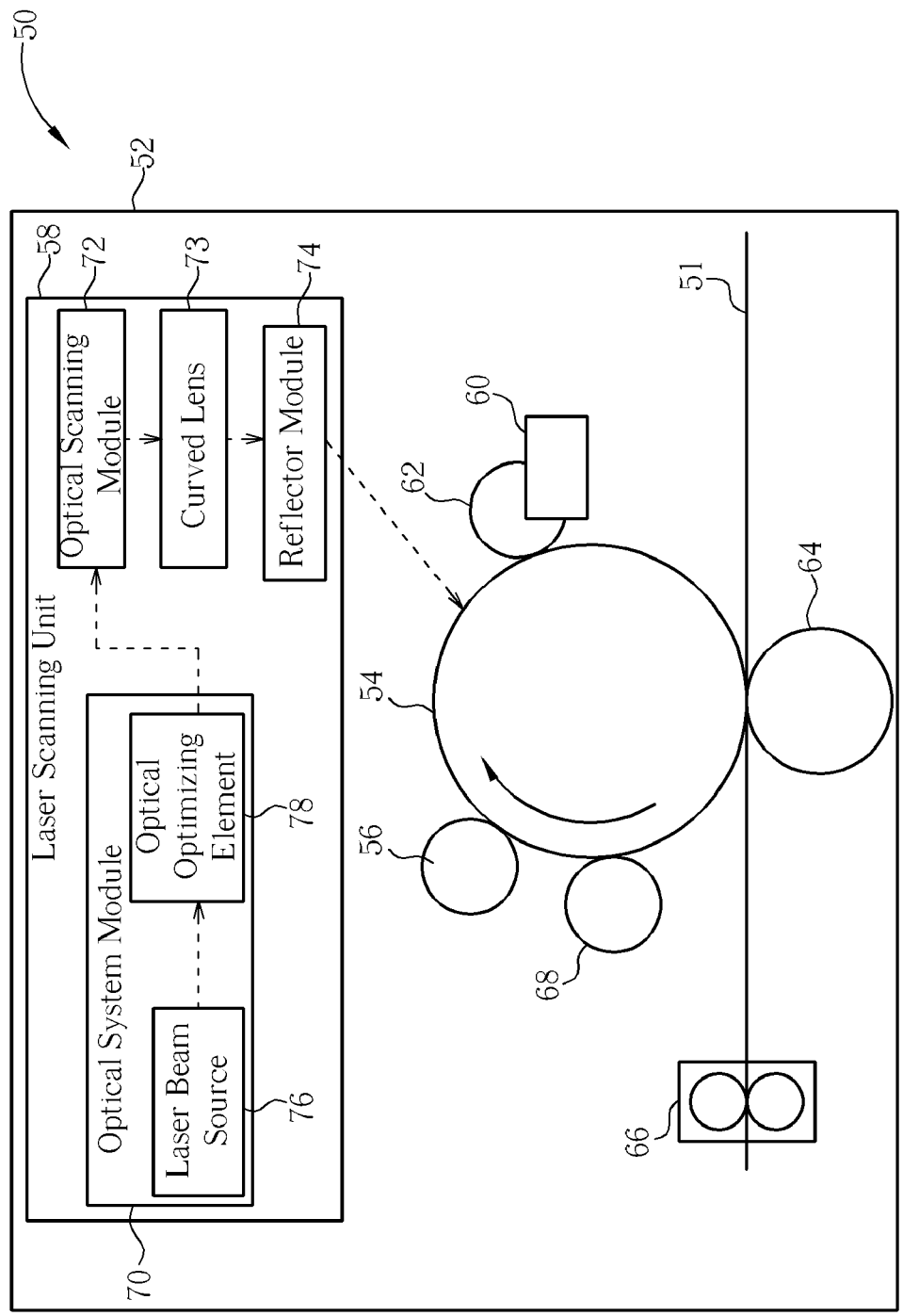
FIG. 4 is a diagram of a laser printer according to the present invention.

Please refer to FIG. 4. FIG. 4 is a diagram of a laser printer 50 according to the present invention. The laser printer 50 comprises a casing 52, an organic photo conductor 54, a charged roller 56, a laser scanning unit 58, a toner cartridge 60, a developer roller 62, a transfer roller 64, a fuser 66, and a discharge unit 68. The casing 52 is for shielding internal components of the laser printer 50. The organic photo conductor 54 is installed inside the casing 52 in a rotatable manner. The charged roller 56 installed inside the casing 52 is for distributing charges on the surface of the organic photo conductor 54. The laser scanning unit 58 installed inside the casing 52 is for projecting laser beams onto the surface of the organic photo conductor 54. The toner cartridge 60 installed inside the casing 52 is for storing toner. The developer roller 62 installed inside the casing 52 and disposed at one side of the toner cartridge 60 is capable of absorbing toner from the toner cartridge 60. The transfer roller 64 installed inside the casing 52 connects to a negative bias (not shown). The fuser 66 installed inside the casing 52 is for melting the plastic portion of the toner. The discharge unit 68 installed inside the casing 52 is for discharging the charges on the organic photo conductor 54.

The printing procedures and principles of the laser printer 50 are introduced below. First, the charged roller 56 distributes electrons and positive charges on the surface of the organic photo conductor 54, and then the laser scanning unit 58 projects laser beams of different power onto a specific region of the surface of the organic photo conductor 54. Because the organic photo conductor 54 is composed of highly-photoconductive material, when the specific region of the surface of the organic photo conductor 54 receives the laser beams emitted from the laser scanning unit 58, the collisions between photons of the laser beams and electrons of the highly-photoconductive material ionize the electrons and make the specific region conductive, so as to form an electrostatic image with lower voltage. The voltage at a position of the electrostatic image is related to the power of the laser beams. In other words, the higher the power of the laser beams projected onto a point, the lower the voltage of this point, and vice versa. Subsequently, when the organic photo conductor 54 rotates to a position where the electrostatic image is adjacent to the developer roller 62, because the developer roller 62 has already absorbed charged toner stored in the toner cartridge 60, parts of the electrostatic image with certain voltages will absorb the charged toner from the developer roller 62, where the lower the voltage of a point on the electrostatic image, the more charged toner the point absorbs. Next, when the organic photo conductor 54 rotates to a position where the electrostatic image is adjacent to the transfer roller 64, because the negative bias the transfer roller 64 is electrically coupled to is much lower than the voltage at any position on the electrostatic image (meaning the absolute value of the negative bias is greater than the absolute value of the voltage at any position on the electrostatic image), the transfer roller 64 is able to transfer the charged toner on the electrostatic image to a print medium 51 between the transfer roller 64 and the organic photo conductor 54. At this time, the toner stays on the print medium 51 temporarily because of the attraction of static electricity. Therefore, any vibration of the laser printer 50 or other external forces will shift the toner on the print medium 51. But, after the print medium 51 passes through the fuser 66, the heat generated by the fuser 66 will melt the plastic portion of the toner on the print medium 51 so as to make the toner stick to the print medium 51. After the transfer roller 64 transfers the toner on the electrostatic image to the print medium 51, and the organic photo conductor 54 rotates to a position where the electrostatic image is adjacent to the discharge unit 68, the discharge unit 68 discharges the charges on the electrostatic image completely, so that when the organic photo conductor 54 rotates to a specific region (the electrostatic image has already disappeared) adjacent to the charged roller 56, the charged roller 56 is able to redistribute charges on the surface of the organic photo conductor 54. In addition, the laser scanning unit 58 comprises an optical system module 70, an optical scanning module 72, a curved lens 73, and a reflector module 74. The optical system module 70 for generating laser beams according to print data comprises a laser beam source 76 for emitting the laser beams, and an optical optimizing element 78 for optimizing the laser beams emitted from the laser beam source 76. The optical scanning module 72 is for reflecting the laser beams generated by the optical system module 70. The curved lens 73 for reflecting the laser beams reflected from the optical scanning module 72 is an f-θ lens. The reflector module 74 is for reflecting the laser beams reflected from the curved lens 73 to the organic photo conductor 54.

Figure 5:
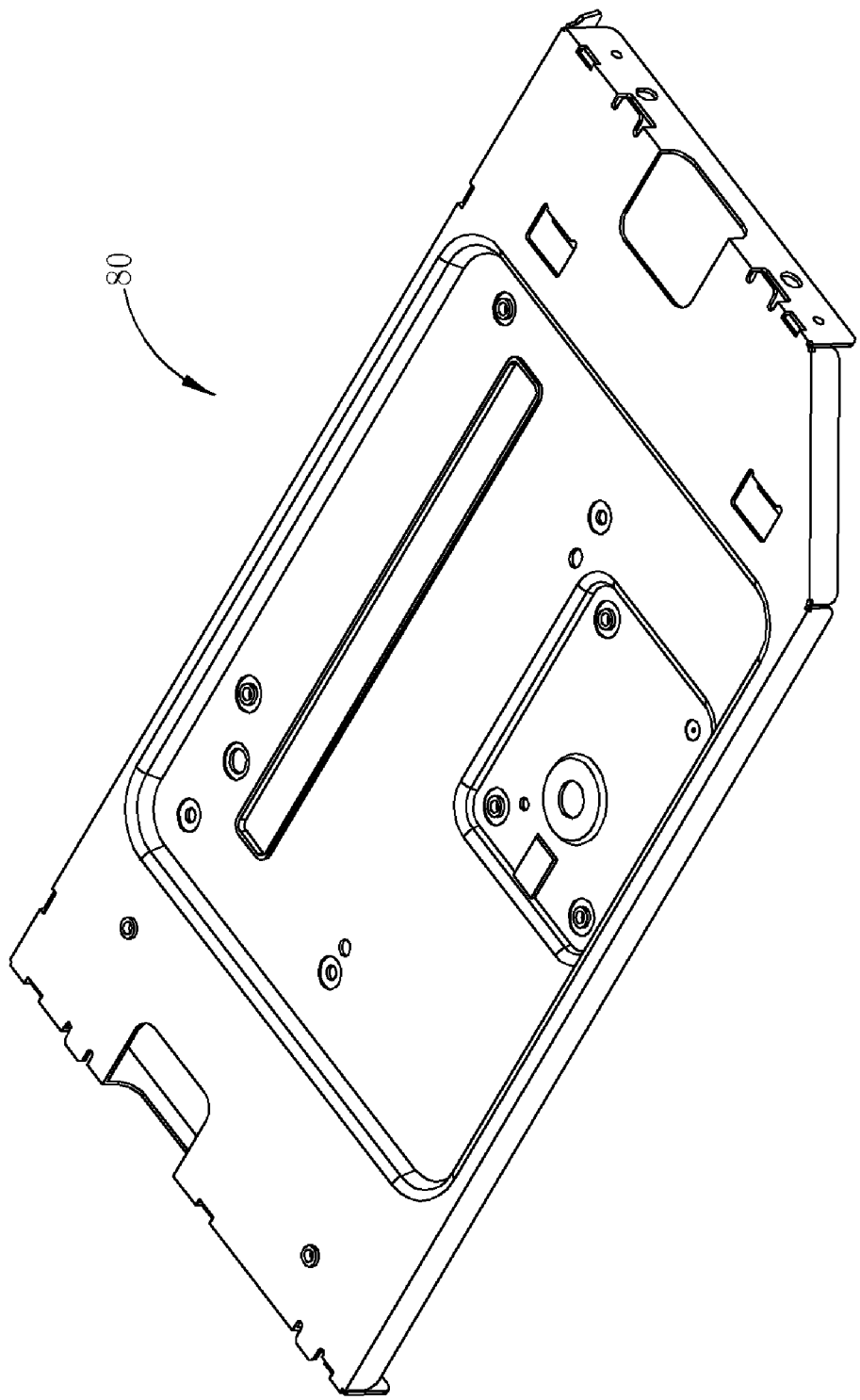
FIG. 5 is a diagram of a frame according to the present invention.
Figure 6:
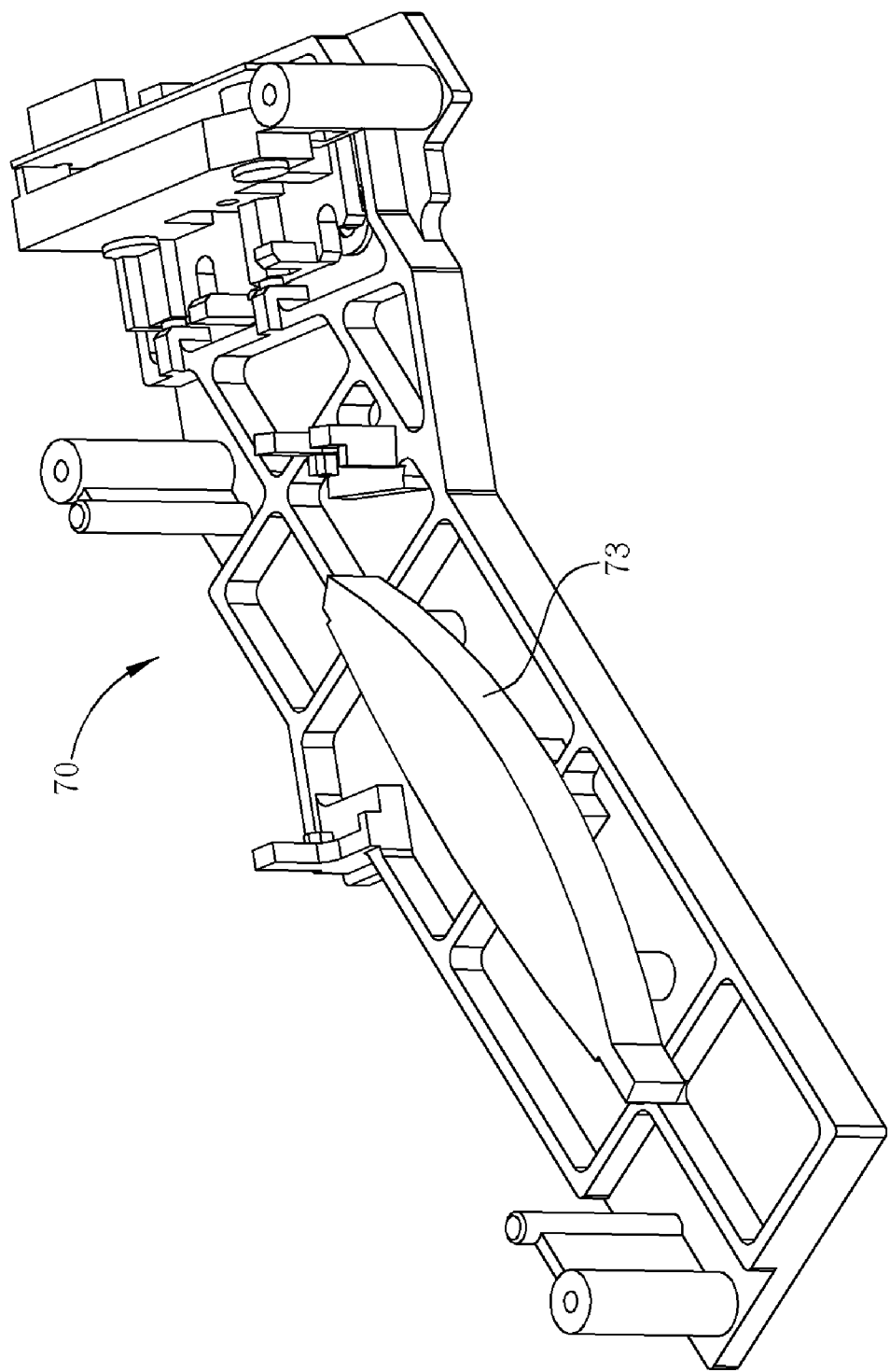
FIG. 6 is a diagram of an optical system module according to the present invention.
Figure 7:
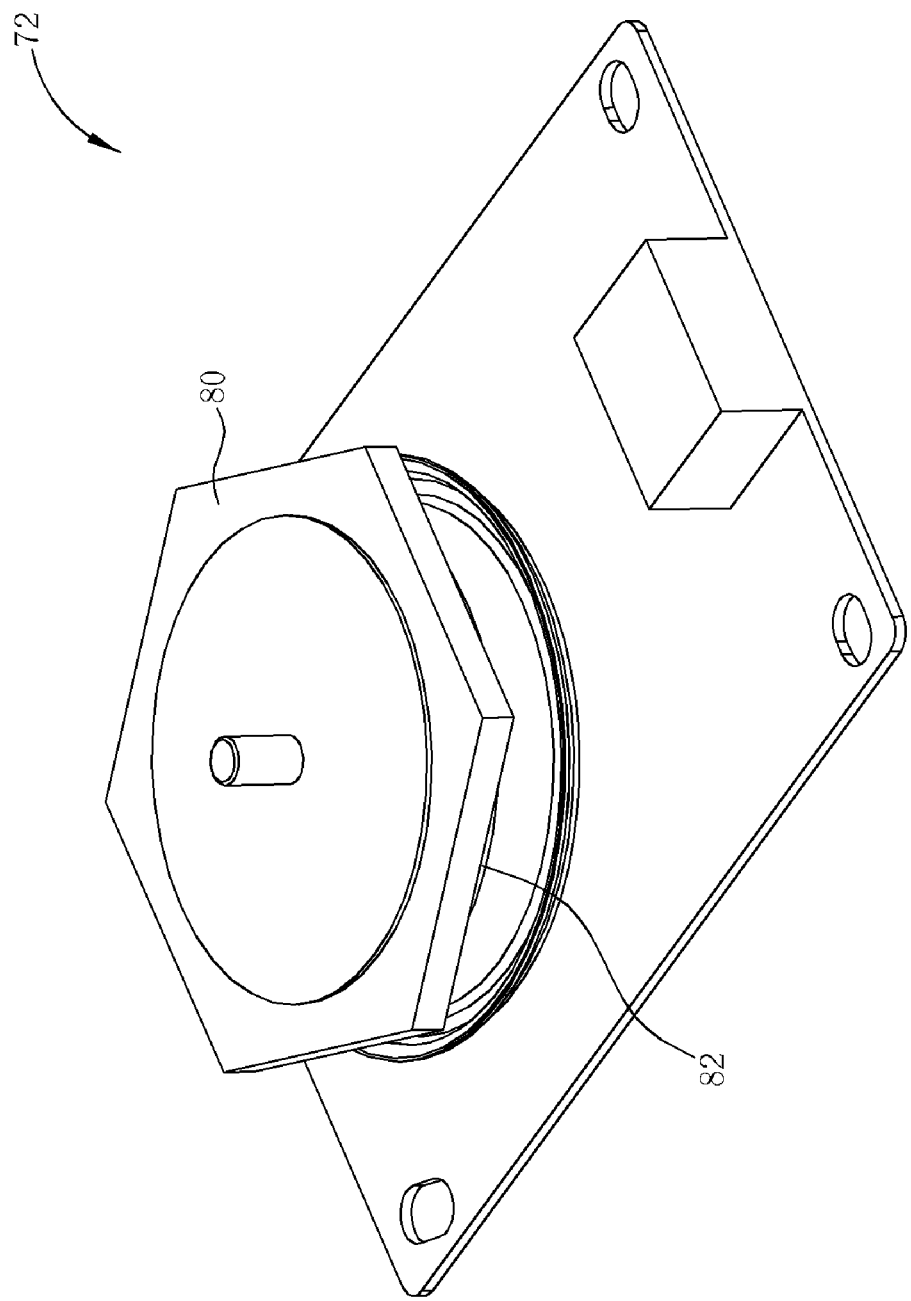
FIG. 7 is a diagram of an optical scanning module according to the present invention.
Figure 8:
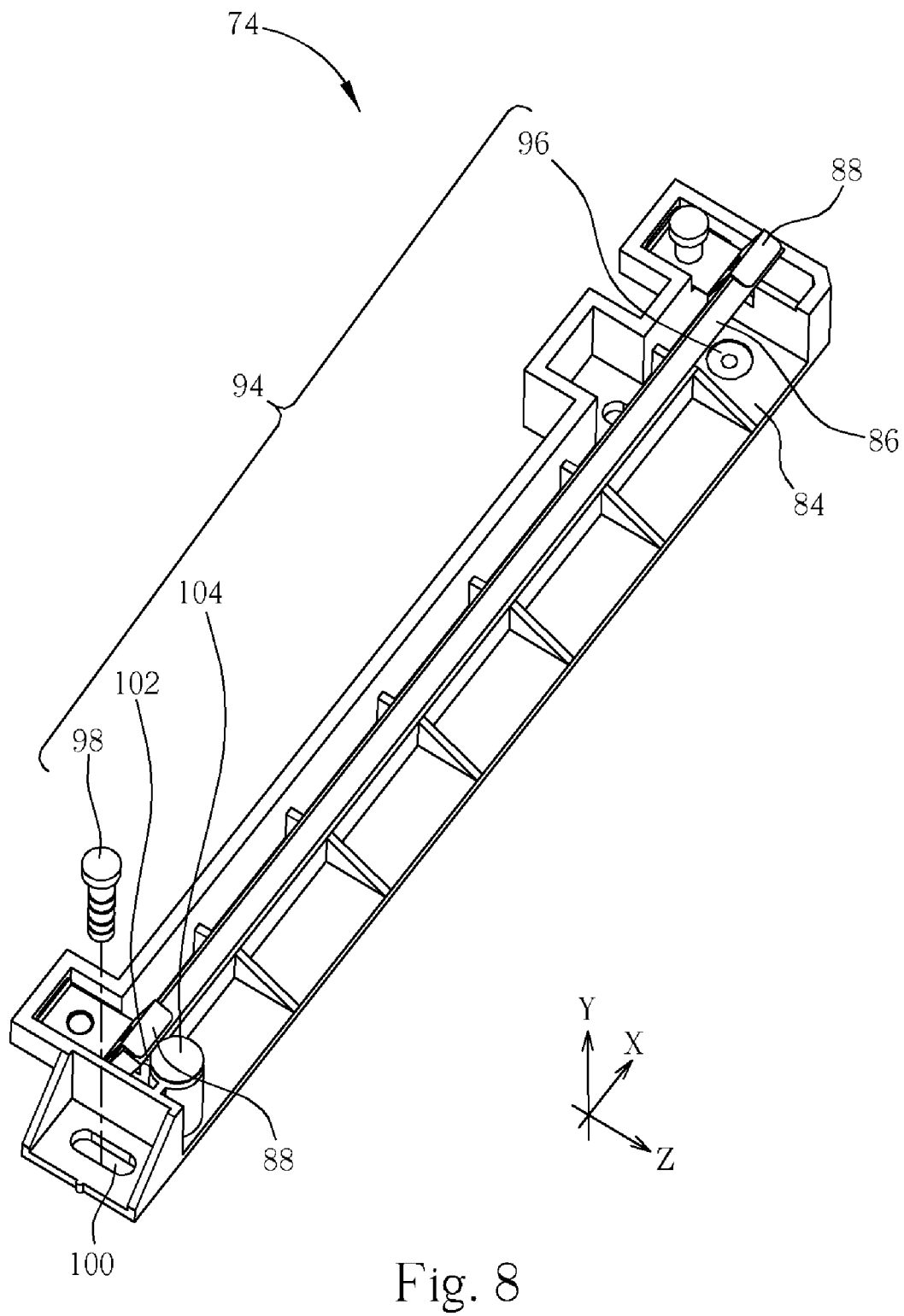
FIG. 8 is a diagram of a reflector module according to the present invention.
Figure 9:
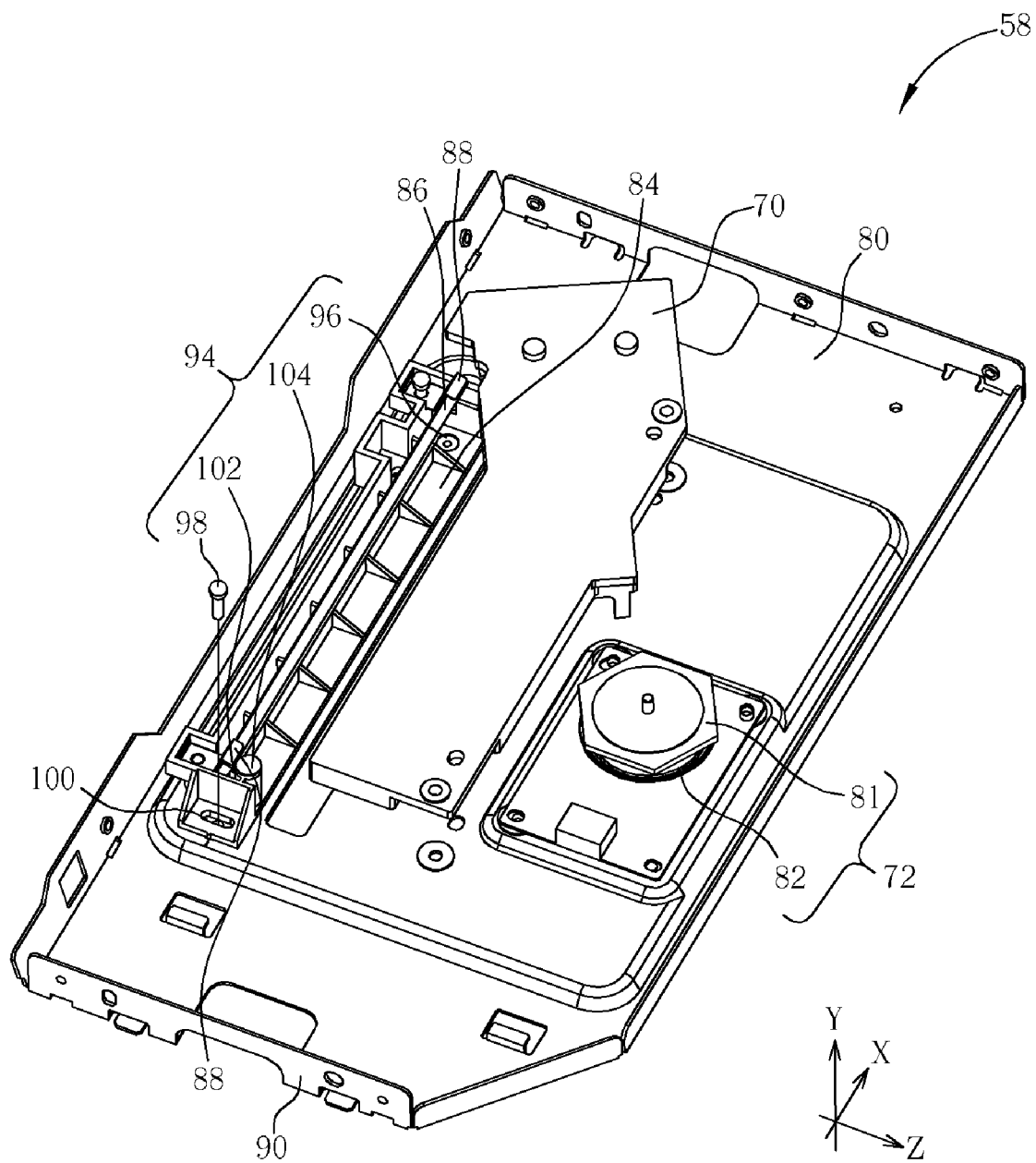
FIG. 9 is a diagram of a laser scanning unit according to the present invention.

Please refer to FIG. 5 to FIG. 9. FIG. 5 is a diagram of a frame 80 according to the present invention. FIG. 6 is a diagram of the optical system module 70 according to the present invention. FIG. 7 is a diagram of the optical scanning module 72 according to the present invention. FIG. 8 is a diagram of the reflector module 74 according to the present invention. FIG. 9 is a diagram of the laser scanning unit 58 according to the present invention. The curved lens 73 is combined with the optical system module 70. The optical scanning module 72 includes a poly-mirror 81 for reflecting the laser beams generated from the optical system module 70, and a motor 82 for driving the poly-mirror structure to rotate. The optical scanning module 72 is a micro-electro-mechanical scanner for reflecting the laser beams generated by the optical system module 70 selectively with a mirror array rotatable to a specific angle. The reflector module 74 comprises a reflector chassis 84, a reflector 86 installed on the reflector chassis 84 for reflecting the laser beams transmitted from the optical scanning module 72 to the organic photo conductor 54, and two pieces of elastic spring connecting the reflector chassis 84 and installed at two ends of the reflector 86 respectively for fixing the angular position of the reflector 86. The laser scanning unit 58 includes a frame 80, and the optical system module 70, the optical scanning module 72, and the reflector 74 are installed on the frame 80 directly. The optical system module 70, the optical scanning module 72, and the reflector module 74 are locked to the frame 80 directly, therefore the assembly procedures can be simplified. A mechanism interface 90 on the frame 80 connects with the laser printer 50, e.g. to connect to the casing 52 in order to secure the laser scanning unit 58.

Figure 10:
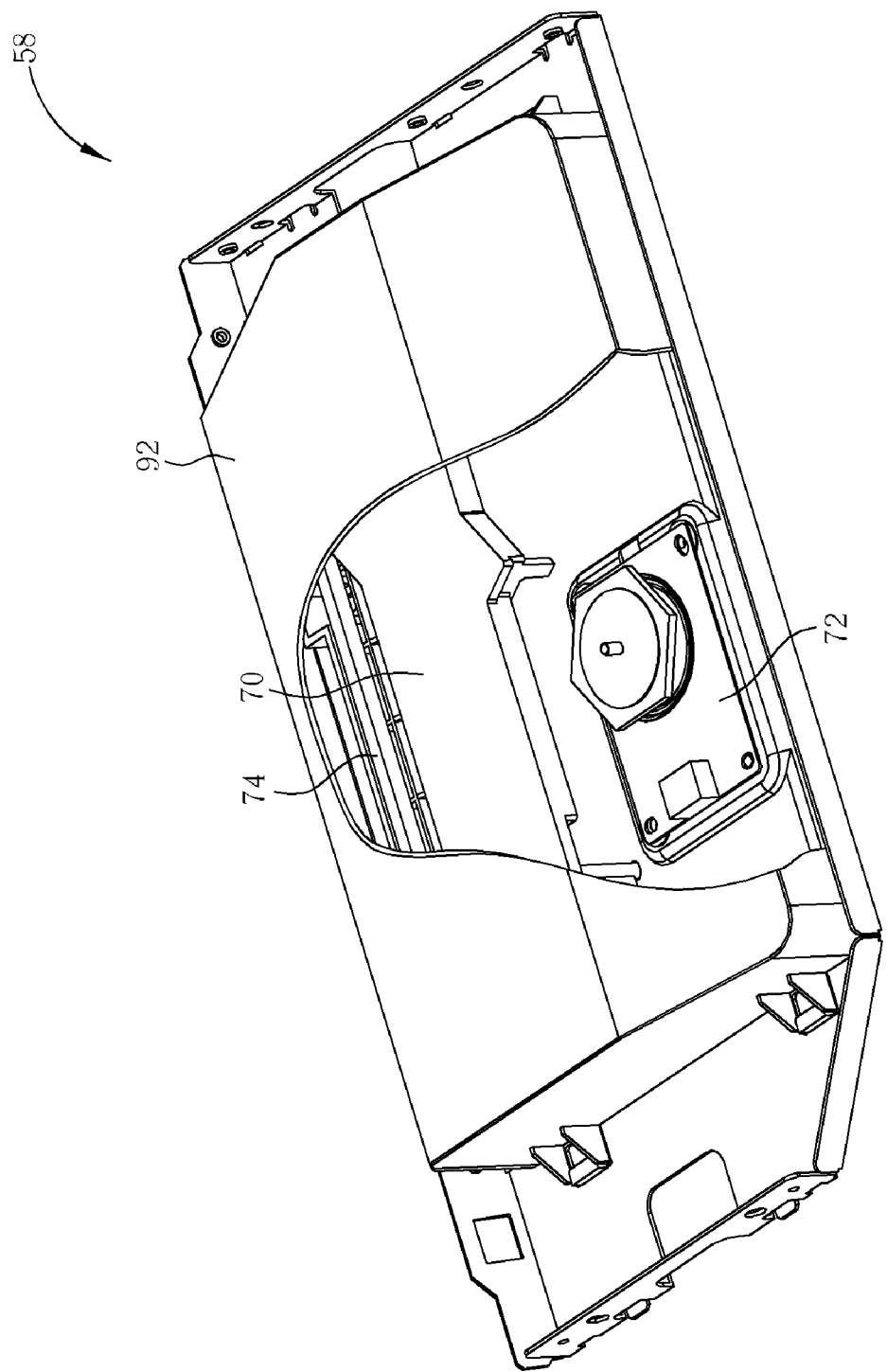
FIG. 10 is a diagram of a laser scanning unit with a dust-proof module according to the present invention.

In addition, please refer to FIG. 10. FIG. 10 is a diagram of the laser scanning unit 58 with a dust-proof module 92 according to the present invention. The laser scanning unit 58 further comprises the dust-proof module 92 installed on the frame 80 for shielding the optical system module 70, the optical scanning module 72, and the reflector module 74 from dust, toner, or other impurities that may fall into the laser scanning unit 58.

Figure 11:
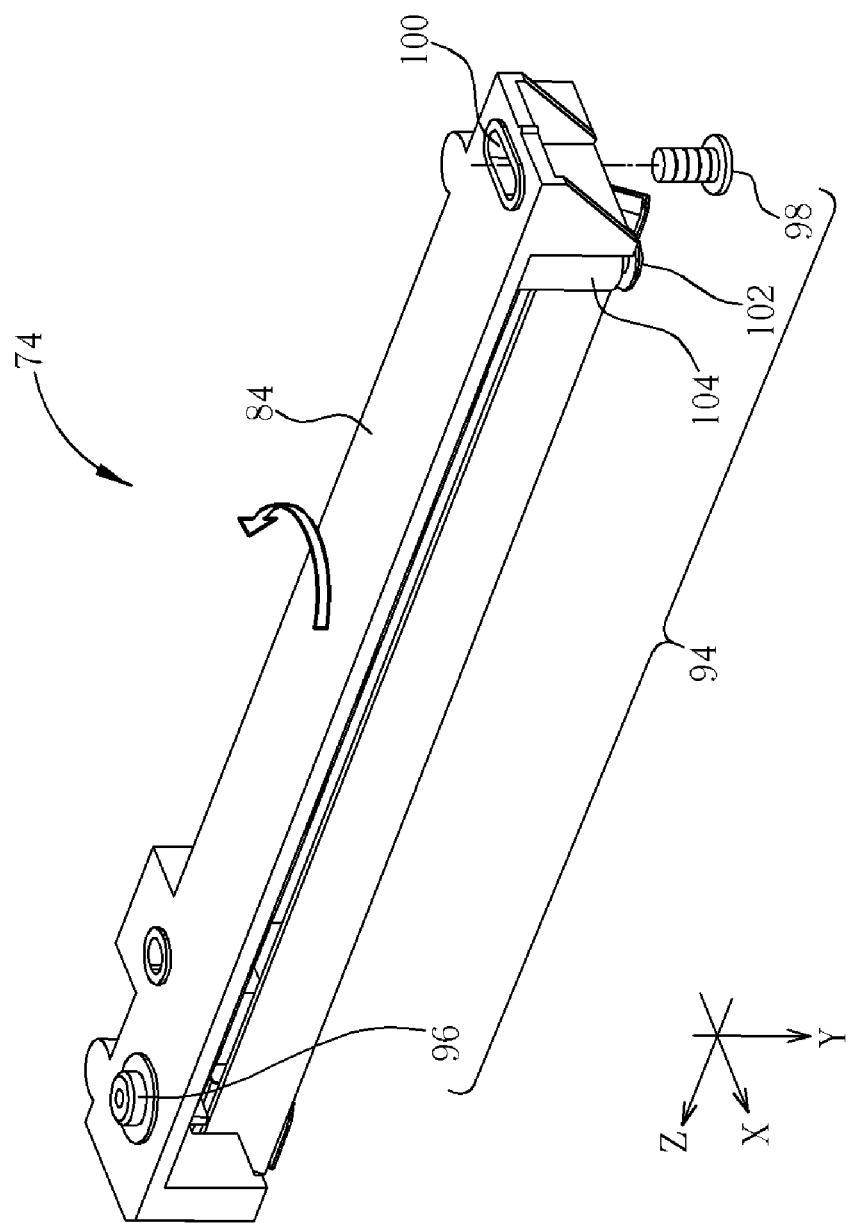
FIG. 11 is a diagram of the back side of a reflector module.

Please refer to FIG. 8, FIG. 9, and FIG. 11. FIG. 11 is a diagram of the back side of the reflector module 74. The reflector module 74 further comprises an adjustment mechanism 94 for adjusting an angular position of the reflector 86. The adjustment mechanism 94 includes a positioning rod 96 disposed near a first end of the reflector chassis 84. The reflector chassis 84 can swing relative to the positioning rod 96 along the Y axis, meaning that the reflector chassis 84 can move horizontally along the X-Z plane in order to adjust the displacement of optical skew of the whole reflector module 74. The adjustment mechanism 94 further comprises a screw 98 inserted through an elongated opening 100 formed near a second end of the reflector chassis 84 for fastening the reflector chassis 84 and the frame 80. That means when the reflector chassis 84 moves horizontally onto the X-Z plane relative to the positioning rod 96, the displacement of optical skew of the whole reflector module 74 is adjusted adequately to a proper position, and the screw 98 is then fastened in the elongated opening 100, so as to secure the positions of the reflector chassis 84 and the frame 80. Furthermore, the adjustment mechanism 94 further comprises a flexible container 102 connected to the reflector chassis 84, the reflector 86 leaning on the flexible container 102, and a fine-tuning screw 104 having a first portion installed inside an aperture of the flexible container 102, and a second portion with gradually increasing diameters for pushing against the flexible container 102 and squeezing the flexible container 102 so as to fine-tune the angular position of the reflector 86. Due to the adjustment mechanism 94 being installed on the frame 80 directly, the present invention conquers the inconvenience of not being able to adjust the angle of the reflector after disassembling the housing from the frame.

Figure 12:
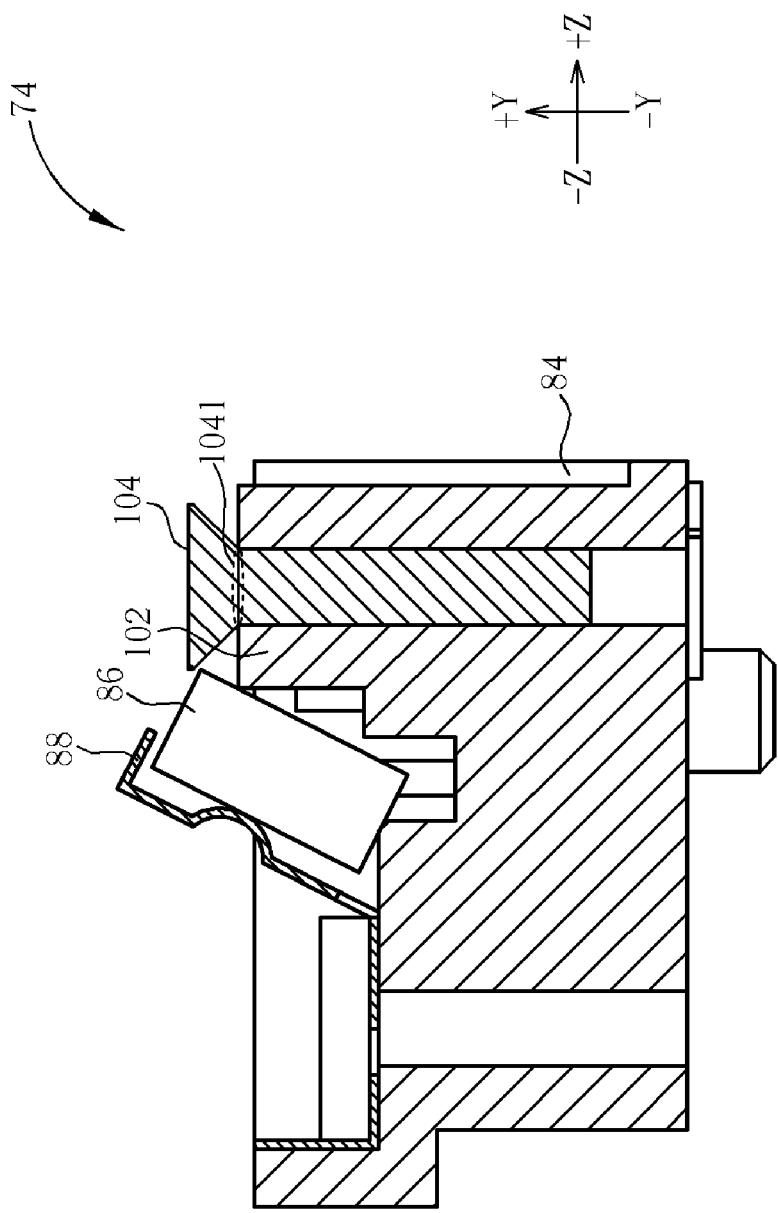
FIG. 12 is a diagram of an original position of the reflector according to the present invention.
Figure 13:
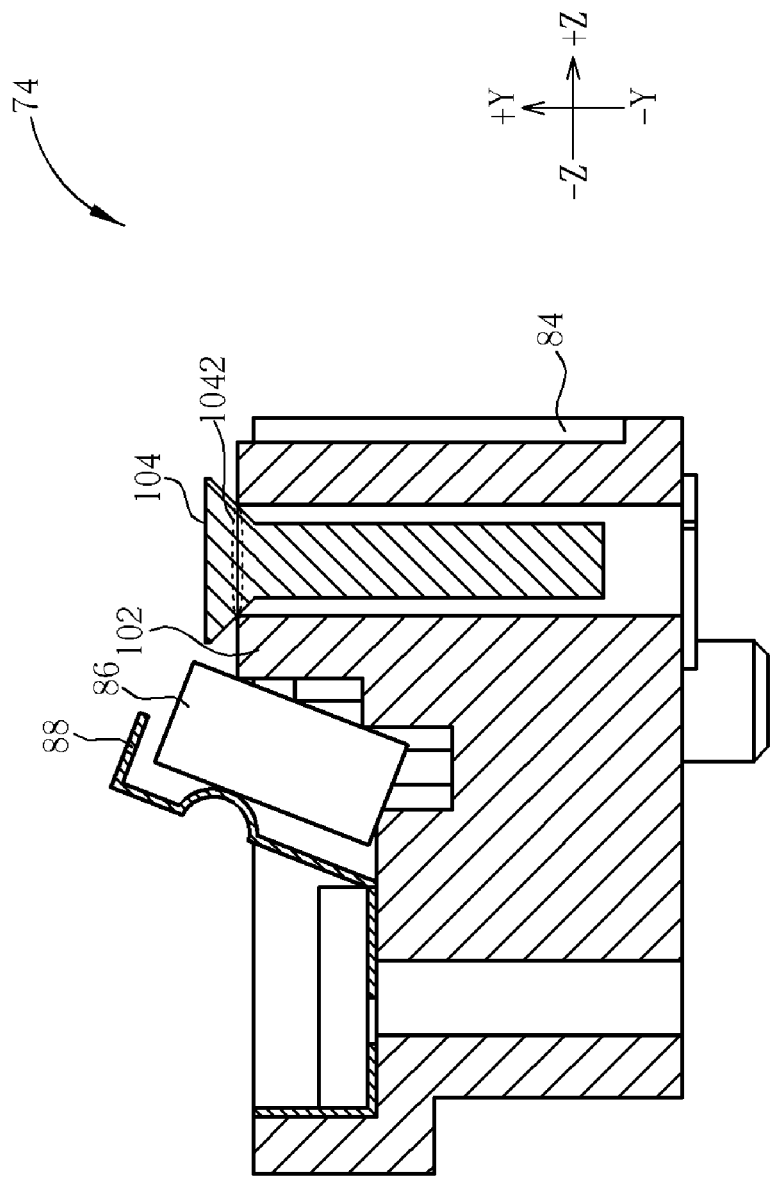
FIG. 13 is a diagram of the reflector after being pushed against a flexible container according to the present invention.

Please refer to FIG. 12 and FIG. 13. FIG. 12 is a diagram of the original position of the reflector 86 according to the present invention. FIG. 13 is a diagram of the reflector 86 after being pushed against the flexible container 102 according to the present invention. The fine-tuning screw 104 has a first portion 1041 and a second portion 1042, the second portion 1042 being larger than the first portion 1041. The user can rotate the fine-tuning screw 104 inside the flexible container 102 along the Y axis in order to position the fine-tuning screw 104 in a first position shown in FIG. 12 or a second position shown in FIG. 13 selectively. When the fine-tuning screw 104 is positioned at the first position, the fine-tuning screw 104 leans against the flexible container 102 with the first portion 1041, At this time, the flexible container 102 just leans against the reflector 86 and does not push the reflector 86 to any angle (the original position of the reflector 86 is called a first angle). When the fine-tuning screw 104 is positioned at the second position, the fine-tuning screw 104 leans against the flexible container 102 with the second portion 1042, meaning that the flexible container 102 pushes the reflector 86 to move toward the Z axis in relation to the fine-tuning screw 104, pushing the flexible container 102 to move toward the Z axis (the flexible container 102 is made of flexible material). In other words, the reflector 86 rolls along the X axis, so as to be positioned at a second angle. And, due to the elastic spring 88 being made of the flexible material, the elastic spring 88 undergoes elastic deformation relative to the motion of the reflector 86. But, the elastic deformation gives an elastic counterforce back to the reflector 86, so that the reflector 86 is held at the second angle. When the fine-tuning screw 104 returns to the first angle, the elastic spring 88 recovers its original shape without any deformation, and gives the reflector 86 an elastic recovering force, so that the reflector 86 goes back to the first position. Due to the fine-tuning screw 104 having several sections, the reflector 86 can be adjusted to plural angles correspondingly. Through the mechanism of adjusting the angles of the reflector 86 by the fine-tuning screw 104, the displacement of optical skew of the whole reflector module 74 can be adjusted.

Figure 14:
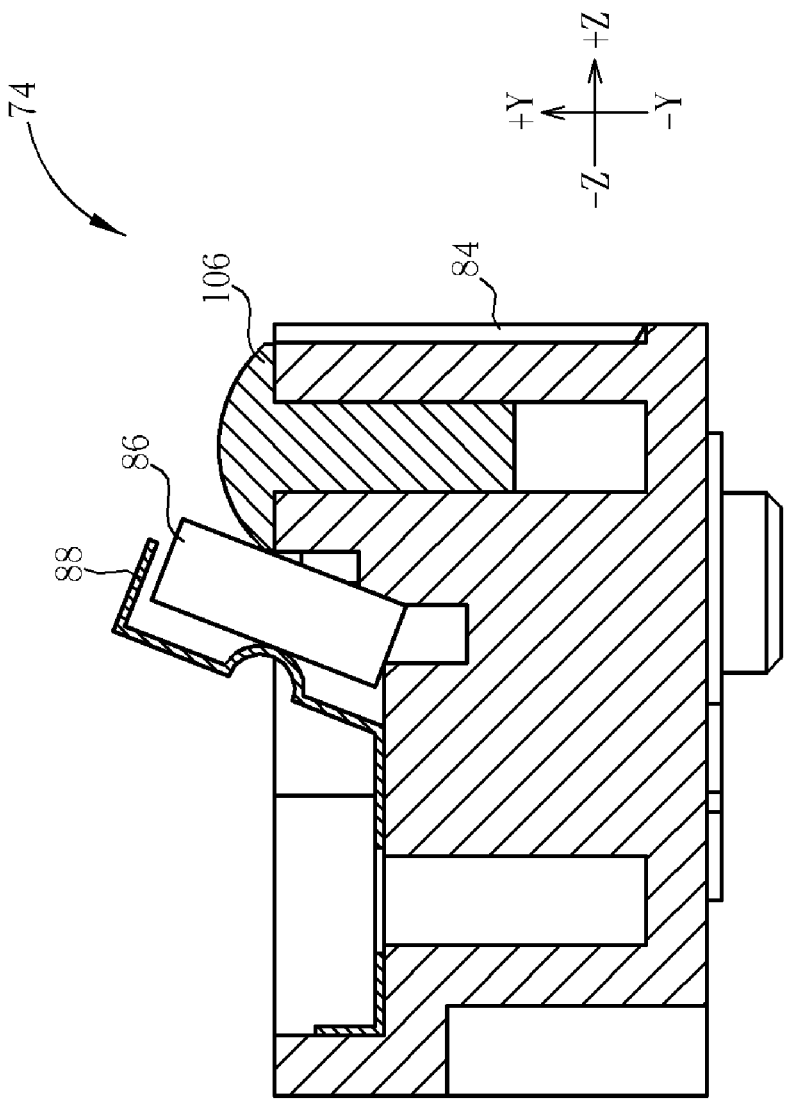
FIG. 14 is a diagram of an original position of the reflector of another embodiment according to the present invention.
Figure 15:
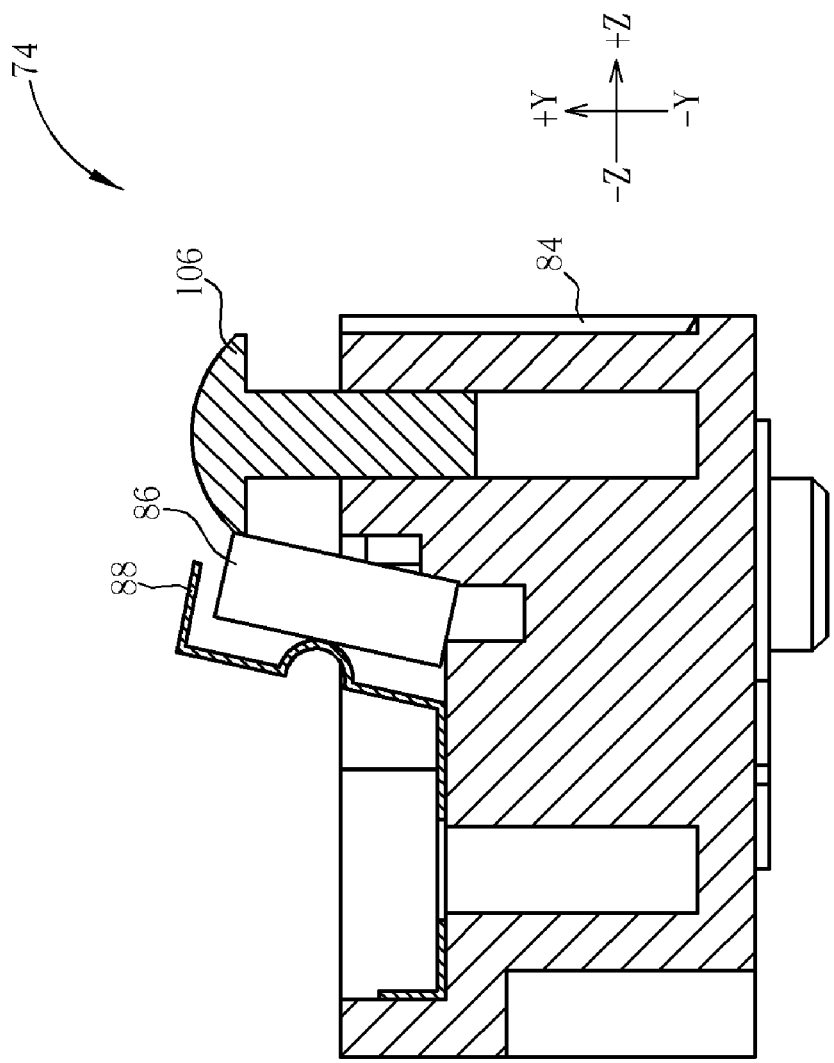
FIG. 15 is a diagram of the reflector of another embodiment after being pushed against a flexible container according to the present invention.

In addition, please refer to FIG. 14 and FIG. 15. FIG. 14 is a diagram of the original position of the reflector 86 of another embodiment according to the present invention. FIG. 15 is a diagram of the reflector 86 of another embodiment after being pushed against the flexible container 102 according to the present invention. The difference between this embodiment and the former embodiment is this embodiment utilizes a fine-tuning screw 106 to push the reflector 86 directly in order to adjust the reflector 86 to a proper angular position. The user can rotate the fine-tuning screw 106 along the Y axis in order to position the fine-tuning screw 106 in a third position shown in FIG. 14 or a fourth position shown in FIG. 15, respectively. When the fine-tuning screw 106 is positioned at the third position, the fine-tuning screw 106 does not push the reflector 86 to any angle (the original position of the reflector 86 is called a third angle). When the fine-tuning screw 106 is positioned at the fourth position, the fine-tuning screw 106 pushes the reflector 86 to move toward the Z axis. In other words, the reflector 86 rolls along the X axis, so as to be positioned at a fourth angle. And, due to the elastic spring 88 being made of the flexible material, the elastic spring 88 undergoes elastic deformation relative to the motion of the reflector 86. But, the elastic deformation gives an elastic counterforce back to the reflector 86, so that the reflector 86 is held at the fourth angle. When the fine-tuning screw 106 returns to the third angle, the elastic spring 88 recovers its original shape without any deformation, and gives the reflector 86 an elastic recovering force, so that the reflector 86 goes back to the third position. Because the fine-tuning screw 106 can be positioned at many different positions, the reflector 86 can be adjusted to different angles correspondingly. Through the mechanism of adjusting the angles of the reflector 86 by the fine-tuning screw 106, the displacement of optical skew of the whole reflector module 74 can be adjusted.

Compared with the prior art, the laser scanning unit of a laser printer according to the present invention is designed without a housing, which means the optical system module, the optical scanning module, and the reflector module are integrated on the frame directly. Therefore, the housing needed in the prior art can be omitted. Hence, simplification of assembly and easy-adjustment of the angle of the reflector can be achieved.

Those skilled in the art will readily observe that numerous modifications and alterations of the device and method may be made while retaining the teachings of the invention.

What is claimed is:

1. A laser scanning unit for a laser printer, comprising:
   a frame connected to a casing;
   an optical system module installed on the frame directly for generating laser beams according to print data;
   an optical scanning module fixed on the frame for reflecting the laser beams generated by the optical system module;
   a curved lens for reflecting the laser beams reflected from the optical scanning module; and
   a reflector module installed on the frame directly for reflecting the laser beams reflected from the curved lens to an organic photo conductor, wherein the reflector module has:
      a reflector chassis;
         a reflector installed on the reflector chassis for reflecting the laser beams transmitted from the optical scanning module to the organic photo conductor; and
      an adjustment mechanism for adjusting an angular position of the reflector,
      wherein the adjustment mechanism has:
         a flexible container connected to the reflector chassis, the reflector leaned on the flexible container; and
         a fine-tuning screw having a first portion installed inside an aperture of the flexible container, and a second portion with gradually increasing diameters for pushing against the flexible container and squeezing the flexible container so as to fine-tune the angular position of the reflector.

2. The laser scanning unit of claim 1, wherein the optical system module comprises: a laser beam source for emitting the laser beams; and
   an optical optimizing element for optimizing the laser beams emitted from the laser beam source.

3. The laser scanning unit of claim 1, wherein the optical system module is fastened on the frame.

4. The laser scanning unit of claim 1, wherein the optical scanning module comprises: a poly-mirror structure for reflecting the laser beams emitted from the optical system module; and a motor for driving the poly-mirror structure to rotate.

5. The laser scanning unit of claim 1, wherein the optical scanning module is a microelectromechanical scanner.

6. The laser scanning unit of claim 1, further comprising a dust-proof module installed on the frame for shielding the optical system module and the optical scanning module.

7. The laser scanning unit of claim 1, wherein the reflector module further comprises an elastic spring for fixing the angular position of the reflector.

8. The laser scanning unit of claim 1, wherein the adjustment mechanism comprises: a positioning rod disposed near a first end of the reflector chassis and connecting the reflector chassis and the frame, the reflector chassis being rotatable with respect to the positioning rod; a screw inserted through an elongated opening formed near a second end of the reflector chassis for fastening the reflector chassis and the frame.

9. The laser scanning unit of claim 1, wherein by adjusting a depth which the first portion of the fine-tuning screw is inserted into the aperture, the angular position of the reflector is adjusted.

10. The laser scanning unit of claim 1, wherein the reflector module is fastened on the frame.

11. A laser printer, comprising:
    a casing;
    an organic photo conductor installed inside the casing in a rotatable manner; and
    a laser scanning unit installed inside the casing, comprising:
       a frame connected to the casing;
       an optical system module installed on the frame directly for generating laser beams according to print data;
       an optical scanning module fixed on the frame for reflecting the laser beams generated by the optical system module;
       a curved lens for reflecting the laser beams reflected from the optical scanning module; and
       a reflector module installed on the frame directly for reflecting the laser beams reflected from the curved lens to an organic photo conductor, wherein the reflector module has:
          a reflector chassis;
             a reflector installed on the reflector chassis for reflecting the laser beams transmitted from the optical scanning module to the organic photo conductor; and
          an adjustment mechanism for adjusting an angular position of the reflector, wherein the adjustment mechanism has:
             a flexible container connected to the reflector chassis, the reflector leaned on the flexible container; and
             a fine-tuning screw having a first portion installed inside an aperture of the flexible container, and a second portion with gradually increasing diameters for pushing against the flexible container and squeezing the flexible container so as to fine-tune the angular position of the reflector.

12. The laser scanning unit of claim 11, wherein the optical system module comprises: a laser beam source for emitting the laser beams; and an optical optimizing element for optimizing the laser beams emitted from the laser beam source.

13. The laser scanning unit of claim 11, wherein the optical system module is fastened on the frame.

14. The laser scanning unit of claim 11, wherein the optical scanning module comprises: a poly-mirror structure for reflecting the laser beams emitted from the optical system module; and a motor for driving the poly-mirror structure to rotate.

15. The laser scanning unit of claim 11, wherein the optical scanning module is a microelectromechanical scanner.

16. The laser scanning unit of claim 11, further comprising a dust-proof module installed on the frame for shielding the optical system module and the optical scanning module.

17. The laser scanning unit of claim 11, wherein the reflector module further comprises an elastic spring for fixing the angular position of the reflector.

18. The laser scanning unit of claim 11, wherein the adjustment mechanism comprises: a positioning rod disposed near a first side of the reflector chassis and connecting the reflector chassis and the frame, the reflector chassis being rotatable with respect to the positioning rod; a screw inserted through an elongated opening formed near a second side of the reflector chassis for fastening the reflector chassis and the frame.

19. The laser scanning unit of claim 11 wherein by adjusting a depth which the first portion of the fine-tuning screw is inserted into the aperture, the angular position of the reflector is adjusted.

20. The laser scanning unit of claim 11, wherein the reflector module is fastened on the frame.

* * * * *